(12) United States Patent
Ah et al.

(10) Patent No.: US 11,550,198 B2
(45) Date of Patent: Jan. 10, 2023

(54) ELECTROCHROMIC DISPLAY DEVICE

(71) Applicant: ELECTRONICS AND TELECOMMUNICATIONS RESEARCH INSTITUTE, Daejeon (KR)

(72) Inventors: Chil Seong Ah, Daejeon (KR); Juhee Song, Daejeon (KR); Hojun Ryu, Seoul (KR); Tae-Youb Kim, Seoul (KR); Sang Hoon Cheon, Daejeon (KR); Doo-Hee Cho, Daejeon (KR); Seong-Mok Cho, Daejeon (KR); Chi-Sun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/519,455

(22) Filed: Nov. 4, 2021

(65) Prior Publication Data
US 2022/0179272 A1     Jun. 9, 2022

(30) Foreign Application Priority Data
Dec. 8, 2020   (KR) .................. 10-2020-0170664

(51) Int. Cl.
*G02F 1/15*     (2019.01)
*G02F 1/155*    (2006.01)
(Continued)

(52) U.S. Cl.
CPC ............... *G02F 1/155* (2013.01); *C09K 9/02* (2013.01); *G02F 1/1347* (2013.01);
(Continued)

(58) Field of Classification Search
CPC .......... G02F 1/15; G02F 1/155; G02F 1/1552; G02F 1/1555; G02F 1/1502;
(Continued)

(56) References Cited

U.S. PATENT DOCUMENTS 7,639,415 B2    12/2009   Jung et al.
8,379,290 B2    2/2013    Chun et al.
(Continued)

FOREIGN PATENT DOCUMENTS

KR   10-2003-0067021 A    8/2003
KR   10-0865629 B1        10/2008
(Continued)

OTHER PUBLICATIONS

Yuyang Wang et al., "A multicolour bistable electronic shelf label based on intramolecular proton-coupled electron transfer", Nature Materials, Dec. 2019, vol. 18, 1335-1343.
(Continued)

*Primary Examiner* — Thoi V Duong
(74) *Attorney, Agent, or Firm* — LRK Patent Law Firm

(57) ABSTRACT

Provided is an electrochromic display device including: a first substrate; a second substrate on the first substrate; an electrolyte layer disposed between the first substrate and the second substrate; a first transparent electrode provided between the electrolyte layer and the first substrate; second transparent electrodes provided between the electrolyte layer and the second substrate; a first electrochromic layer provided between the first transparent electrode and the electrolyte layer; and a second electrochromic layer provided between the second transparent electrodes and the electrolyte layer, wherein the second transparent electrodes each extend in a first direction and be disposed apart from each other in a second direction perpendicular to the first direction, the second electrochromic layer extends between
(Continued)

the second transparent electrodes and contacts a lower surface of the second substrate, the first electrochromic layer includes an inorganic electrochromic material, and the second electrochromic layer includes an organic electrochromic material.

11 Claims, 9 Drawing Sheets

(51) Int. Cl.
G02F 1/1343 (2006.01)
G02F 1/1347 (2006.01)
G02F 1/1524 (2019.01)
G02F 1/1516 (2019.01)
C09K 9/02 (2006.01)
G02F 1/1339 (2006.01)

(52) U.S. Cl.
CPC .... *G02F 1/13439* (2013.01); *G02F 1/134309* (2013.01); *G02F 1/1516* (2019.01); *G02F 1/1524* (2019.01); *C09K 2211/1007* (2013.01); *C09K 2211/1014* (2013.01); *G02F 1/1339* (2013.01)

(58) Field of Classification Search
CPC .... G02F 1/1516; G02F 1/1523; G02F 1/1524; G02F 1/1508; G02F 1/164; G02F 1/1343; G02F 1/134309; G02F 1/13439; G02F 1/13437; G02F 1/1339; G02F 1/161; C09K 9/00; C09K 9/02; C09K 2211/1007; C09K 2211/1014; C01G 41/02; C07C 217/84; C07F 9/50
See application file for complete search history.

(56) References Cited

U.S. PATENT DOCUMENTS 9,575,388 B2 2/2017 Ah et al.
9,581,876 B1 2/2017 Cho et al.

FOREIGN PATENT DOCUMENTS

KR 10-1708373 B1 2/2017
KR 20170063322 * 6/2017 ............... G02F 1/15

OTHER PUBLICATIONS

Weiran Zhang et al., "Bio-inspired ultra-high energy efficiency bistable electronic billboard and reader", Nature Comminications, 2019.

* cited by examiner

ELECTROCHROMIC DISPLAY DEVICE

CROSS-REFERENCE TO RELATED APPLICATION

This U.S. non-provisional patent application claims priority under 35 U.S.C. § 119 of Korean Patent Application No. 10-2020-0170664, filed on Dec. 8, 2020, the entire content of which is hereby incorporated by reference.

BACKGROUND

1. Field of the Invention

The present disclosure relates to an electrochromic display device, and more particularly, to an electrochromic display device adjustable in size and shape of pixels.

2. Description of Related Art

Electrochromism refers to the phenomenon that materials are reversibly colored or bleached in response to electrochemical oxidation or reduction reactions of chromic materials. Electrochromic devices may include materials which are colored upon the gain of electrons (i.e., reduction reaction) or upon the loss of electrons (i.e., oxidation reaction). The electrochromic devices are non-self-luminous information display devices, which use external light sources, and offer good outdoor visibility and show a high contrast ratio under strong light. In addition, the electrochromic devices allow an easy control of transmittance through a driving voltage, have a low driving voltage and a large view angle, and thus, have been extensively studied in various fields.

SUMMARY

The present disclosure provides an electrochromic display device adjustable in size and shape of pixels to display fine patterns.

The present disclosure is not limited to the technical problems described above, and those skilled in the art may understand other technical problems from the following description.

An embodiment of the inventive concept provides an electrochromic display device including: a first substrate; a second substrate provided on the first substrate; an electrolyte layer disposed between the first substrate and the second substrate; a first transparent electrode provided between the electrolyte layer and the first substrate; a plurality of second transparent electrodes provided between the electrolyte layer and the second substrate; a first electrochromic layer provided between the first transparent electrode and the electrolyte layer; and a second electrochromic layer provided between the second transparent electrodes and the electrolyte layer, wherein the second transparent electrodes each may extend in a first direction and be disposed apart from each other in a second direction perpendicular to the first direction, the second electrochromic layer may extend between the second transparent electrodes and contact a lower surface of the second substrate, the first electrochromic layer may include an inorganic electrochromic material, the second electrochromic layer may include an organic electrochromic material, and the organic electrochromic material contains a material represented by Formula 1 or Formula 2 below.

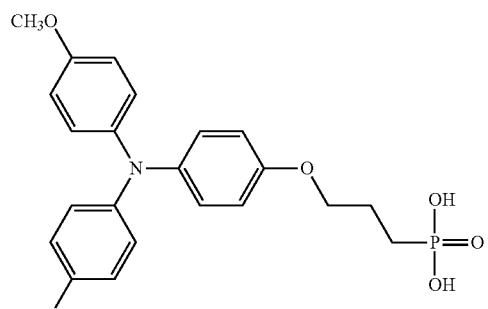

[Formula 1]

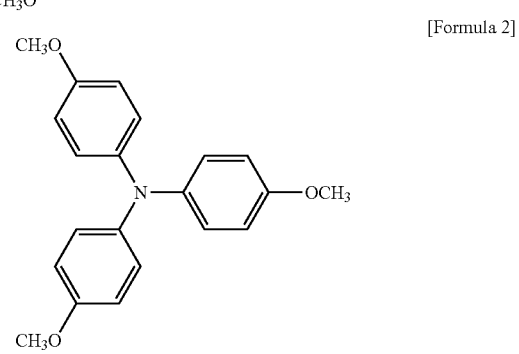

[Formula 2]

In an embodiment, the inorganic electrochromic material may include tungsten oxide ($WO_3$).

In an embodiment, the second transparent electrodes each may have a width of about 10 nm to about 100 mm in the second direction.

In an embodiment, the second transparent electrodes each may have a separation distance of about 10 nm to about 1,000 mm in the second direction.

In an embodiment, the first transparent electrode may be provided in plurality, wherein the first transparent electrodes may extend in the second direction and be disposed apart from each other in the first direction.

In an embodiment, the first transparent electrodes and the second transparent electrodes may be arranged in the form of a grid when viewed in a plane.

In an embodiment, the first electrochromic layer may extend between the first transparent electrodes and contact an upper surface of the first substrate.

In an embodiment, any one of the first transparent electrodes and any one of the second transparent electrodes may form a unit pixel, wherein the unit pixel may display a transparent color or a blue color.

In an embodiment, the electrochromic display device may further include a sealing material provided between the first substrate and the second substrate, wherein the sealing material may cover side surfaces of the first electrochromic layer and the second electrochromic layer.

In an embodiment, the second electrochromic layer may further include a porous structure containing metal oxide, and the organic electrochromic material may be adsorbed in the porous structure.

In an embodiment, the metal oxide may include titanium oxide ($TiO_2$) or indium tin oxide (ITO).

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
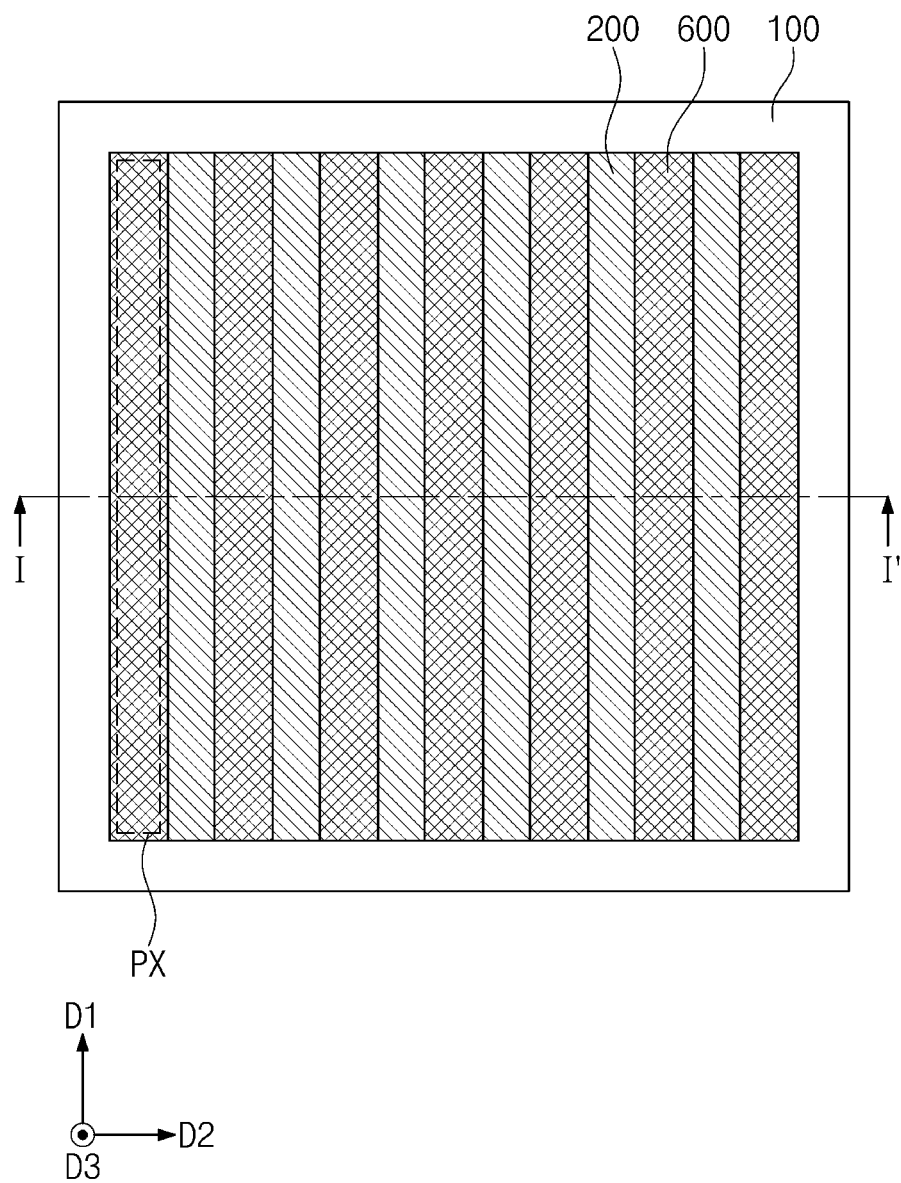
FIG. 1 is a plan view of an electrochromic display device according to an embodiment of the inventive concept.

In order to fully understand the configuration and effects of the inventive concept, preferred embodiments of the inventive concept will be described below in more detail with reference to the accompanying drawings.

The inventive concept may be embodied in different forms and variously modified and changed, and should not be constructed as limited to the embodiments set forth herein. Rather, these embodiments are provided so that this disclosure will be thorough and complete, and will fully convey the scope of the inventive concept to those skilled in the art. In the drawings, the sizes of respective elements are exaggerated for convenience of description, and the ratios of respective elements may be exaggerated or reduced.

The terminology used herein is not for delimiting the embodiments of the inventive concept but for describing the embodiments. Unless otherwise defined, all terms used herein have the same meaning as commonly understood by one of ordinary skill in the art to which this invention pertains.

The terms of a singular form may include plural forms unless otherwise specified. It will be further understood that the terms "comprises" and/or "comprising", when used 'in this description, specify the presence of stated elements, steps, operations, and/or components, but do not preclude the presence or addition of one or more other elements, steps, operations, and/or components.

It will be understood that when a layer is referred to as being "on" another layer, it can be formed directly on an upper surface of another layer, or a third layer may be interposed therebetween.

Though terms like a first, and a second are used to describe various regions and layers in the present description, the regions and the layers are not limited to these terms. These terms are used only to tell one region or layer from another region or layer. Therefore, a portion referred to as a first portion in one embodiment may be referred to as a second portion in another embodiment. An embodiment described and illustrated herein includes a complementary embodiment thereof. Like reference numerals refer to like elements throughout.

Figure 2:
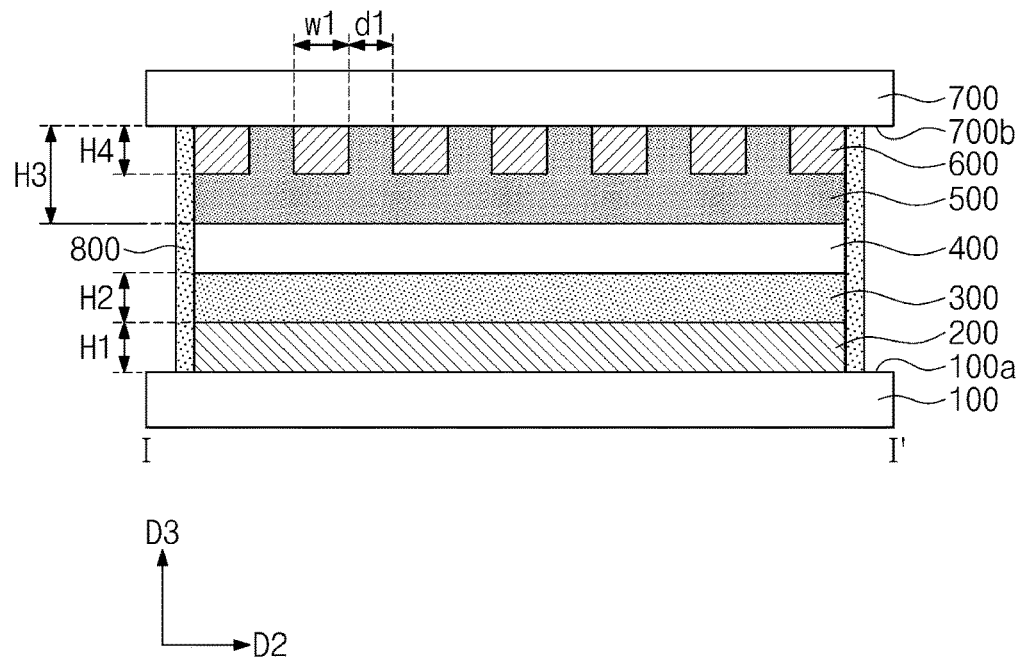
FIG. 2 is a cross-sectional view taken along line I-I' of FIG. 1.

FIG. 1 is a plan view of an electrochromic display device according to an embodiment of the inventive concept. FIG. 2 is a cross-sectional view taken along line I-I' of FIG. 1.

Referring to FIGS. 1 and 2, an electrochromic display device according to an embodiment of the inventive concept may include a first substrate 100, a first transparent electrode 200, a first electrochromic layer 300, an electrolyte layer 400, a second electrochromic layer 500, second transparent electrodes 600, and a second substrate 700.

The first substrate 100 may be provided. The first substrate 100 may include glass, polymer, fiber, cellulose, and plastic. The first substrate 100 may include an upper surface 100a in contact with the first transparent electrode 200 and a lower surface facing the upper surface 100a.

The first transparent electrode 200 may be provided on the upper surface 100a of the first substrate 100. The lower surface of the first transparent electrode 200 may be in contact with the upper surface 100a of the first substrate 100. The lower surface of the first substrate 100 may have a smaller cross-section width than the upper surface 100a of the first substrate 100. The first transparent electrode 200 may include a single layer or a plurality of stacked layers. When viewed in a plane, the first transparent electrode 200 may cover the upper surface 100a of the first substrate 100, but may not cover an edge region of the first substrate 100. The first transparent electrode 200 may be in the form of a flat plate having flat upper and lower surfaces. The first transparent electrode 200 may be transparent. The first transparent electrode 200 may include a conductive material. For example, the first transparent electrode 200 may include at least one among indium zinc oxide (IZO), indium tin oxide (ITO), fluorine-doped tin oxide (FTO), aluminum-doped zinc oxide (AZO), boron-doped zinc oxide (BZO), tungsten-doped zinc oxide (WZO), tungsten-doped tin oxide (WTO), gallium-doped zinc oxide (GZO), antimony-doped tin oxide (ATO), indium-doped zinc oxide (IZO), and niobium (Nb)-doped titanium oxide (TiOx), single oxide-metal-oxide (OMO), multiple oxide-metal-oxide (OMO), conductive polymer, conductive organic molecule, carbon nanotube, graphene, silver nanowire, aluminum, silver, ruthenium, gold, platinum, tin, chromium, indium, zinc, copper, rubidium, nickel, ruthenium oxide, rubidium oxide, tin oxide, indium oxide, zinc oxide, chromium oxide, and molybdenum. The first transparent electrode 200 may have a thickness H1 of about 0.1 nm to about 10 μm. The thickness H1 of the first transparent electrode 200 may be a value measured in a third direction D3 from the upper surface 100a of the first substrate 100. In the present description, the first direction D1 may be a direction parallel to the upper surface 100a of the first substrate 100, and the second direction D2 may be a direction parallel to the upper surface 100a of the first substrate 100, but perpendicular to the first direction D1. The third direction D3 may be a direction perpendicular to the upper surface 100a of the substrate 100.

The first electrochromic layer 300 may be provided on an upper surface of the first transparent electrode 200. More specifically, the first electrochromic layer 300 may be provided between the electrolyte layer 400 and the first transparent electrode 200. The first electrochromic layer 300 may include an inorganic electrochromic material enabling bleaching or coloring. In the first electrochromic layer 300, a chromic reaction in which an inorganic electrochromic material is oxidized or reduced may take place. More specifically, when the inorganic electrochromic material is oxidized, the first electrochromic layer 300 may be bleached to become transparent, and when the inorganic electrochromic material is reduced, the first electrochromic layer 300 may be colored to become opaque. For example, the inorganic electrochromic material may include an inorganic material such as tungsten oxide ($WO_3$), but is not limited thereto, and may include various materials. The electrochromic layer 300 may have a thickness H2 of about 10 nm to about 10 μm.

The electrolyte layer 400 may be provided between the first electrochromic layer 300 and the second electrochromic layer 500. The electrolyte layer 400 may be in contact with an upper surface of the first electrochromic layer 300, but may not be in contact with the first transparent electrode 200. The electrolyte layer 400 may be a source of ions involved in the chromic reaction taking place in the first electrochromic layer 300 or the second electrochromic layer 500. The electrolyte layer 400 may be an ion charge transfer channel between the first transparent electrode 200 and the second transparent electrode 600. The electrolyte layer 400 may be in the form of a liquid, a solid, or a gel, and may include at least one of a polymer, an organic molecule, an ionic liquid, a solvent, a lithium ion product, or a hydrogen ion product.

Specifically, the polymer may include at least one among poly(ethylene glycol) (PEG), poly methyl methacrylate (PMMA), poly butyl acrylate (PBA), poly vinyl butyrate (PVB), polyvinyl alcohol (PVA), poly(ethylene oxide) (PEO), poly(propylene oxide) (PPO), poly acrylonitrile (PAN), poly(vinylidene fluoride) (PVDF), poly(vinylidene fluoride-co-hexafluoropropylene) (PVDF-HFP), and a block copolymer.

The organic molecule, the ionic liquid, and the solvent each may include at least one among propylene carbonate (PC), butylene carbonate (BC), ethylene carbonate (EC), gamma-butyloactone (gamma-BL), gamma-VL, NMO, dimethyl carbonate (DMC), diethyl carbonate (DEC), ethylmethyl carbonate (EMC), propylmethyl carbonate (PMC), ethyl acetate (EA), ethylene blue (EB), water ($H_2O$), methylene blue (MB), morpholinium, imidazolium, quaternary ammonium, quaternary phosphonium, $Br^-$, $Cl^-$, $NO_3^-$, $BF_4^-$, and $PF_6^-$.

The lithium ion product may include at least one among lithium perchlorate ($LiClO_4$), $LiBF_4$, $LiPF_6$, $LiAsF_6$, LiTf (lithium triflate, $LiCF_3SO_3$), LiIm (lithium imdide, $Li[N(SO_2CF_3)_2]$), $LiBeTi(Li[N(SO_2CF_2CF_3)_2])$, LiBr, and LiI.

The hydrogen ion product may include at least one among hydrochloric acid (HCl), sulfuric acid ($H_2SO_4$), nitric acid ($HNO_3$), phosphoric acid ($H_3PO_4$), acetic acid ($CH_3COOH$), perchloric acid ($HClO_4$), and formic acid (HCOOH).

The second electrochromic layer 500 may be provided on an upper surface of the electrolyte layer 400. More specifically, the second electrochromic layer 500 may be provided between the electrolyte layer 400 and the second transparent electrodes 600, and between the electrolyte layer 400 and the second substrate 700. The second electrochromic layer 500 may extend between the second transparent electrodes 600 and contact a lower surface 700b of the second substrate 700. The second electrochromic layer 500 may have a thickness H3 of about 10 nm to about 10 μm. According to an embodiment, the second electrochromic layer 500 may include an organic electrochromic material enabling bleaching or coloring. More specifically, in the second electrochromic layer 500, a chromic reaction in which an organic electrochromic material is oxidized or reduced may take place. More specifically, when the organic electrochromic material is oxidized, the second electrochromic layer 500 may be colored to become opaque, and when the organic electrochromic material is reduced, the second electrochromic layer 500 may be bleached to become transparent. The organic electrochromic material may include an organic material. The organic electrochromic material may include, for example, 3-(4-(bis(4-methoxyphenyl)amino)phenoxy) propylphosphonic acid, and may be represented by Formula 1 below.

[Formula 1]

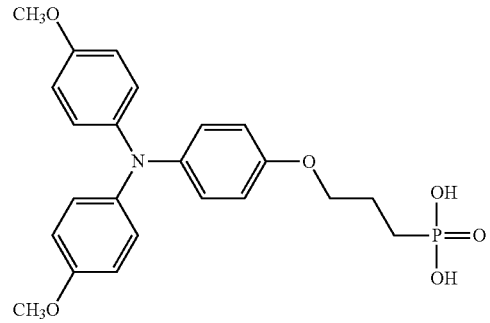

As another example, the organic electrochromic material may include 3-(4-(bis(4-methoxyphenyl)amino)phenoxy) propyl, and may be represented by Formula 2 below.

[Formula 2]

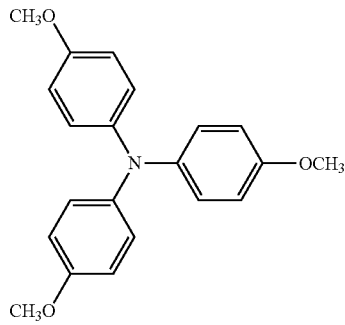

According to another embodiment, the second electrochromic layer 500 may further include a porous structure containing metal oxide. More specifically, the porous structure may be a nanostructure containing titanium oxide ($TiO_2$) or indium tin oxide (ITO). In this case, the organic electrochromic material may be adsorbed in the porous structure to form the second electrochromic layer 500.

The second transparent electrodes 600 may be provided on a lower surface 700b of the second substrate 700. An upper surface of each of the second transparent electrodes 200 may be in contact with the lower surface 700b of the second substrate 700. Each of the second transparent electrode 600 may include a single layer or a plurality of stacked layers. When viewed in a plane, each of the second transparent electrodes 600 may extend parallel to the first direction D1. The second transparent electrodes 600 may be disposed apart from each other in the second direction D2. That is, the second transparent electrodes 600 may be in the form of a line having a certain width when viewed in a plane. Each of the second transparent electrodes 600 may have a width W1 of about 10 nm to about 100 mm in the second direction D2. Each of the second transparent electrodes 600 may have a separation distance d1 of about 10 nm to about 1,000 mm in the second direction D2. The second transparent electrodes 600 may be transparent. Although not shown, the second transparent electrodes 600 may be in the form of a curve as well as a straight line. The second transparent electrodes 600 may include the same material as the first transparent electrode 200. For example, the second transparent electrodes 600 may include at least one among indium zinc oxide (IZO), indium tin oxide (ITO), fluorine-doped tin oxide (FTO), aluminum-doped zinc oxide (AZO), boron-doped zinc oxide (BZO), tungsten-doped zinc oxide (WZO), tungsten-doped tin oxide (WTO), gallium-doped zinc oxide (GZO), antimony-doped tin oxide (ATO), indium-doped zinc oxide (IZO), and niobium (Nb)-doped titanium oxide (TiOx), single oxide-metal-oxide (OMO), multiple oxide-metal-oxide (OMO), conductive polymer, conductive organic molecule, carbon nanotube, graphene, silver nanowire, aluminum, silver, ruthenium, gold, platinum, tin, chromium, indium, zinc, copper, rubidium, nickel, ruthenium oxide, rubidium oxide, tin oxide, indium oxide, zinc oxide, chromium oxide, and molybdenum. Each of the second transparent electrodes 600 may have a thickness H4 of about 0.1 nm to about 10 µm. The thickness H4 of the second transparent electrodes 600 may be a value measured in a direction opposite to the third direction D3 from the lower surface 100b of the second substrate 700.

Any one of the first transparent electrode 200 or the second transparent electrodes 600 may form a single unit pixel PX. More specifically, when viewed in a plane, a region in which any one of the first transparent electrode 200 or the second transparent electrodes 600 overlaps may form a single unit pixel PX region. The unit pixel PX may be provided in plurality. According to an embodiment, each of the unit pixels PX may be in the form of a line having a certain width when viewed in a plane. When the chromic reaction takes place in the first electrochromic layer 300 and the second electrochromic layer 500, the unit pixels PX may become transparent or opaque.

According to an embodiment, terminal electrodes may be respectively connected to the second transparent electrodes 600. Each of the terminal electrodes may electrically connect a corresponding second transparent electrode 600 of the second transparent electrodes 600 and the first transparent electrode 200. The terminal electrodes may be electrically separated to independently apply a driving voltage to each of the second transparent electrodes 600. For example, the driving voltage may be in the form of a pulse, and may be about −5V to about 5V. Accordingly, the plurality of unit pixels PX may each independently become transparent or opaque, and thus, an electrochromic display device capable of displaying various patterns may be provided.

Still referring to FIG. 2, the electrochromic display device according to an embodiment of the inventive concept may further include a sealing material 800. The sealing material 800 may be provided between the first substrate 100 and the second substrate 700 to seal the space between the first substrate 100 and the second substrate 700. The sealing material 800 may fix the first substrate 100 with the second substrate 700. More specifically, the sealing material 800 may cover a side surface of each of the first transparent electrode 200, the first electrochromic layer 300, the electrolyte layer 400, the second electrochromic layer 500, and the second transparent electrodes 600. In particular, when the electrolyte layer 400 is a liquid or a gel having fluidity, the electrolyte layer 400 may be sealed between the first electrochromic layer 300 and the second electrochromic layer 500 through the sealing material 800. The sealing material 800 may be formed of, for example, a surlyn film, a photocuring agent, or a thermosetting agent.

Figure 3:
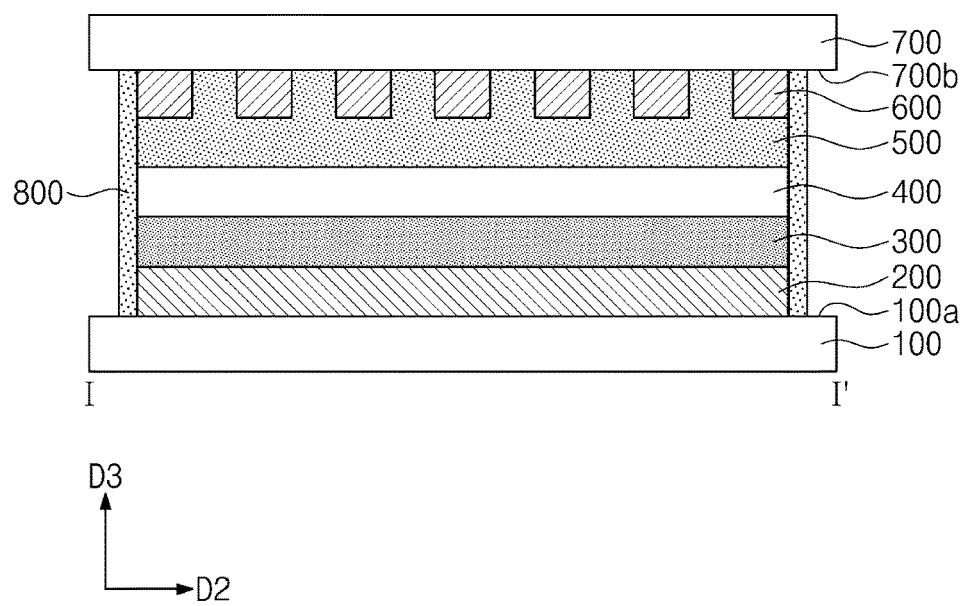
FIG. 3 is a view for describing an electrochromic display device according to an embodiment of the inventive concept, and corresponds to a cross-section taken along line I-I' of FIG. 1.

FIG. 3 is a view for describing an electrochromic display device according to an embodiment of the inventive concept, and corresponds to a cross-section taken along line I-I' of FIG. 1. Hereinafter, descriptions overlapping the descriptions described above will be omitted, and differences will be described in more detail.

Referring to FIG. 3, an electrochromic display device according to an embodiment may include a first substrate 100, a first transparent electrode 200, a first electrochromic layer 300, an electrolyte layer 400, a second electrochromic layer 500, second transparent electrodes 600, and a second substrate 700. The first substrate 100, the first transparent electrode 200, the electrolyte layer 400, the second transparent electrodes 600, and the second substrate 700 may be substantially the same as those described in FIGS. 1 and 2.

The first electrochromic layer 300 may be provided between the electrolyte layer 400 and the second transparent electrodes 600, and between the electrolyte layer 400 and the second substrate 700. More specifically, the first electrochromic layer 300 may extend between the second transparent electrodes 600 and contact a lower surface 700b of the second substrate 700. The first electrochromic layer 300 may include an inorganic electrochromic material enabling bleaching or coloring. For example, the inorganic electrochromic material may include tungsten oxide ($WO_3$), but is not limited thereto, and may include various materials. The second electrochromic layer 500 may be provided between the first transparent electrode 200 and the electrolyte layer 400. The second electrochromic layer 500 may include an organic electrochromic material, and the organic electrochromic material may be the same as the organic electrochromic material described in FIGS. 1 and 2.

Figure 4:
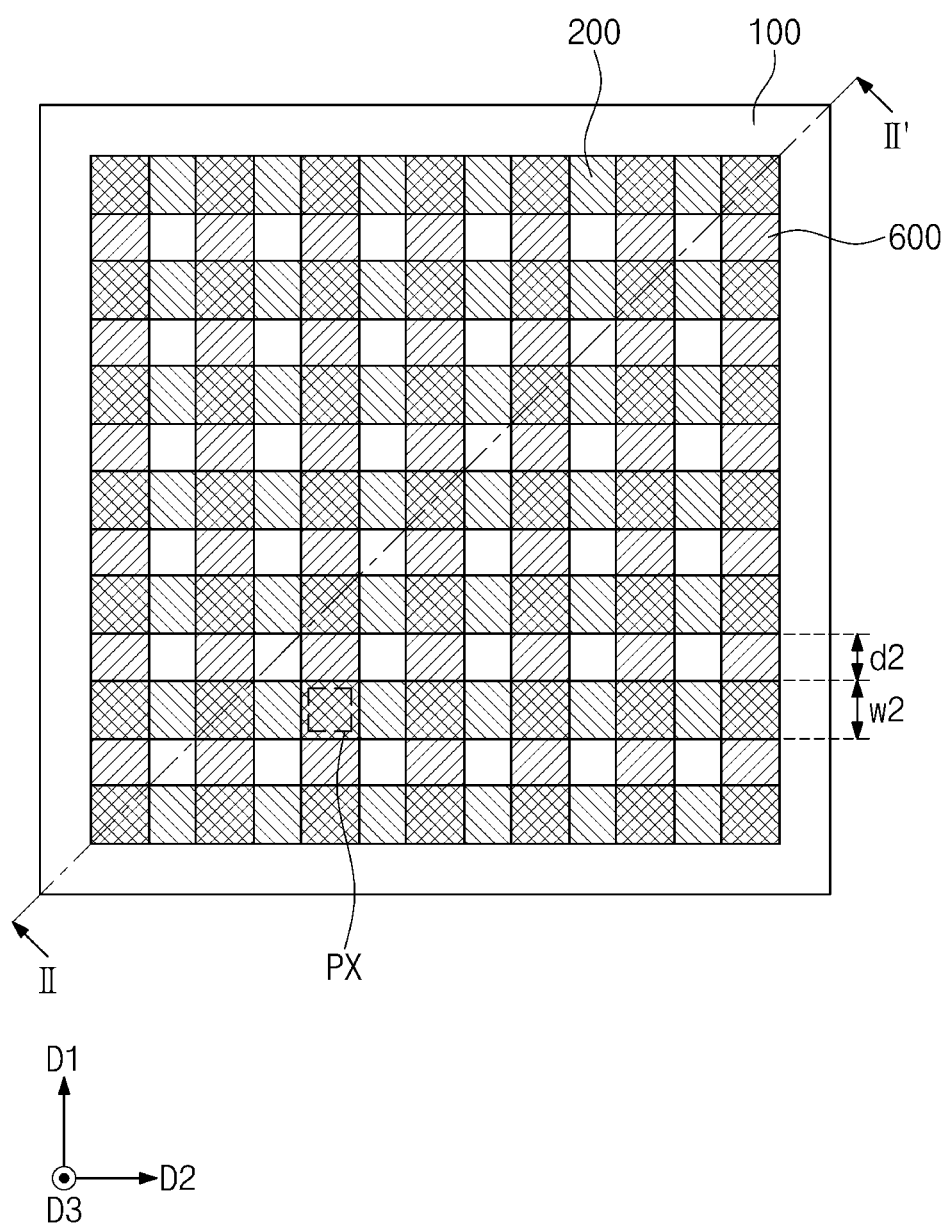
FIG. 4 is a plan view of an electrochromic display device according to an embodiment of the inventive concept.
Figure 5:
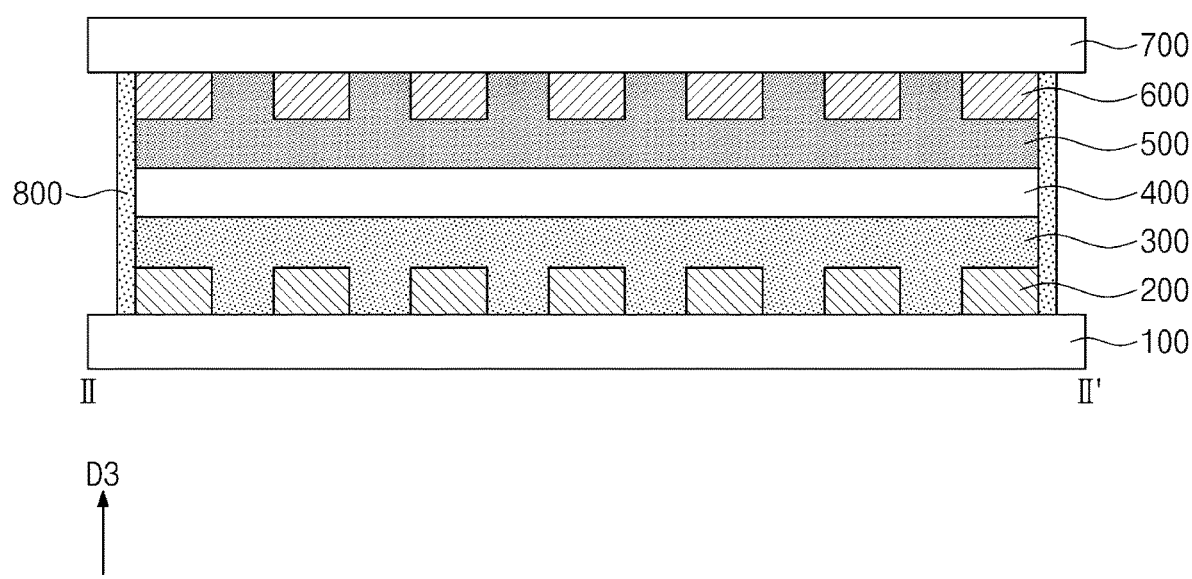
FIG. 5 is a cross-sectional view taken along line II-II' of FIG. 4.

FIG. 4 is a plan view of an electrochromic display device according to an embodiment of the inventive concept. FIG. 5 is a cross-sectional view taken along line II-II' of FIG. 4. Hereinafter, descriptions overlapping the descriptions described above will be omitted, and differences will be described in more detail.

Referring to FIGS. 4 and 5, an electrochromic display device according to an embodiment may include a first substrate 100, first transparent electrodes 200, a first electrochromic layer 300, an electrolyte layer 400, a second electrochromic layer 500, second transparent electrodes 600, and a second substrate 700. The first substrate 100, the electrolyte layer 400, the second electrochromic layer 500, the second transparent electrodes 600, and the second substrate 700 may be substantially the same as those described in FIGS. 1 and 2.

A plurality of first transparent electrodes 200 may be provided on an upper surface 100a of the first substrate 100. A lower surface of each of the first transparent electrodes 200 may be in contact with the upper surface 100a of the first substrate 100. When viewed in a plane, each of the first transparent electrodes 200 may extend parallel to the second direction D2. The first transparent electrodes 200 may be disposed apart from each other in the first direction D1. That is, the first transparent electrodes 200 may be in the form of a line having a certain width when viewed in a plane. Each of the first transparent electrodes 200 may have a width W2 of about 10 nm to about 100 mm in the first direction D1. Each of the first transparent electrodes 200 may have a separation distance d2 of about 10 nm to about 1,000 mm in the first direction D1. Accordingly, when viewed in a plane, the first transparent electrodes 200 and the second transparent electrodes 600 may be disposed in the form of a grid.

Any one of the first transparent electrodes 200 or any one of the second transparent electrodes 600 may form a single unit pixel PX. More specifically, when viewed in a plane, a region in which any one of the first transparent electrodes 200 or any one of the second transparent electrodes 600 overlaps may form a single unit pixel PX region. The unit pixel PX may be provided in plurality. According to an embodiment, each of the unit pixels PX may be in the form of a rectangular dot when viewed in a plane. When the chromic reaction takes place in the first electrochromic layer 300 and the second electrochromic layer 500, the unit pixels PX may become transparent or opaque.

According to an embodiment, terminal electrodes each may be connected to the first transparent electrodes 200. Each of the terminal electrodes may electrically connect any one of the first transparent electrodes 200 and any one of the second transparent electrodes 600. The terminal electrodes may be electrically separated to independently apply a driving voltage to each of the first transparent electrodes 200. For example, the driving voltage may be in the form of a pulse, and may be about −5V to about 5V. Accordingly, the plurality of unit pixels PX may each independently become transparent or opaque, and thus, an electrochromic display device capable of displaying finer patterns may be provided.

FIGS. 6 to 11 are views for describing a method of manufacturing an electrochromic display device according to an embodiment of the inventive concept.

Figure 6:
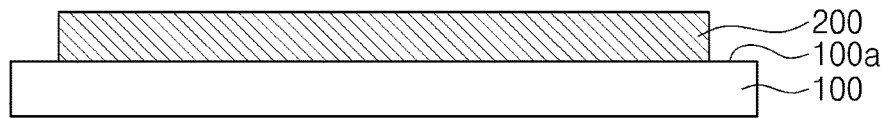
FIGS. 6 to 11 are views for describing a method of manufacturing an electrochromic display device according to an embodiment of the inventive concept.

Referring to FIG. 6, a first substrate 100 may be prepared. A conductive material may be applied onto an upper surface 100a of the first substrate 100 to form a first transparent electrode 200. Although not shown, the first transparent electrode 200 may or may not be patterned using lasers.

Figure 7:
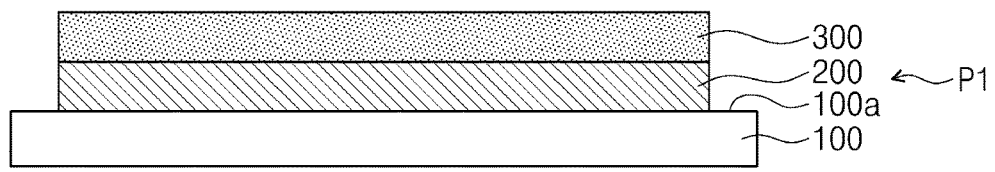

Referring to FIG. 7, a first electrochromic layer 300 may be formed on the first transparent electrode 200. An inorganic electrochromic material may be applied onto the first transparent electrode 200 to form the first electrochromic layer 300. An inorganic electrochromic material may be applied onto the first transparent electrode 200 through a vacuum process or a wet process to form the first electrochromic layer. The inorganic electrochromic material may be, for example, tungsten oxide ($WO_3$). Accordingly, a first structure P1 including the first substrate 100, the first transparent electrode 200, and the first electrochromic layer 300 may be formed.

Figure 8:
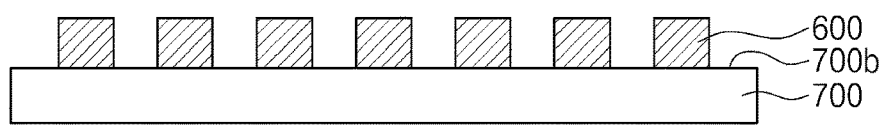

Referring to FIG. 8, a second substrate 700 may be prepared. Second transparent electrodes 600 may be formed on a lower surface 700b by vertically inverting the second substrate 700. The forming of the second transparent electrodes 600 may include applying a conductive material onto a lower surface 700b of the second substrate 700 and patterning the coated surface with lasers to form one or more second transparent electrodes 600. The lower surface 700b of the second substrate 700 may be exposed between the second transparent electrodes 600.

Figure 9:
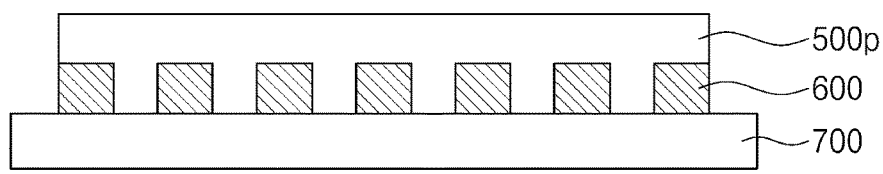

Referring to FIG. 9, a preliminary second electrochromic layer 500p may be formed on the lower surface 700b of the second substrate 700, and the second transparent electrodes 600. The forming of the preliminary second electrochromic layer 500p may include preparing a slurry, applying the slurry onto the lower surface 700b of the substrate 700 and the second transparent electrodes 600, and performing a heat treatment process.

More specifically, the slurry may be titanium oxide ($TiO_2$) or indium tin oxide (ITO). The applying of the slurry may be performed through a doctor blade method or a slot-die method. In this case, the slurry may cover the lower surface 700b of the second substrate 700 exposed by the second transparent electrodes 600 and the second transparent electrodes 600, and fill the space between the second transparent electrodes 600. After the applying, a heat treatment process may be performed to form a porous structure 500p.

Figure 10:
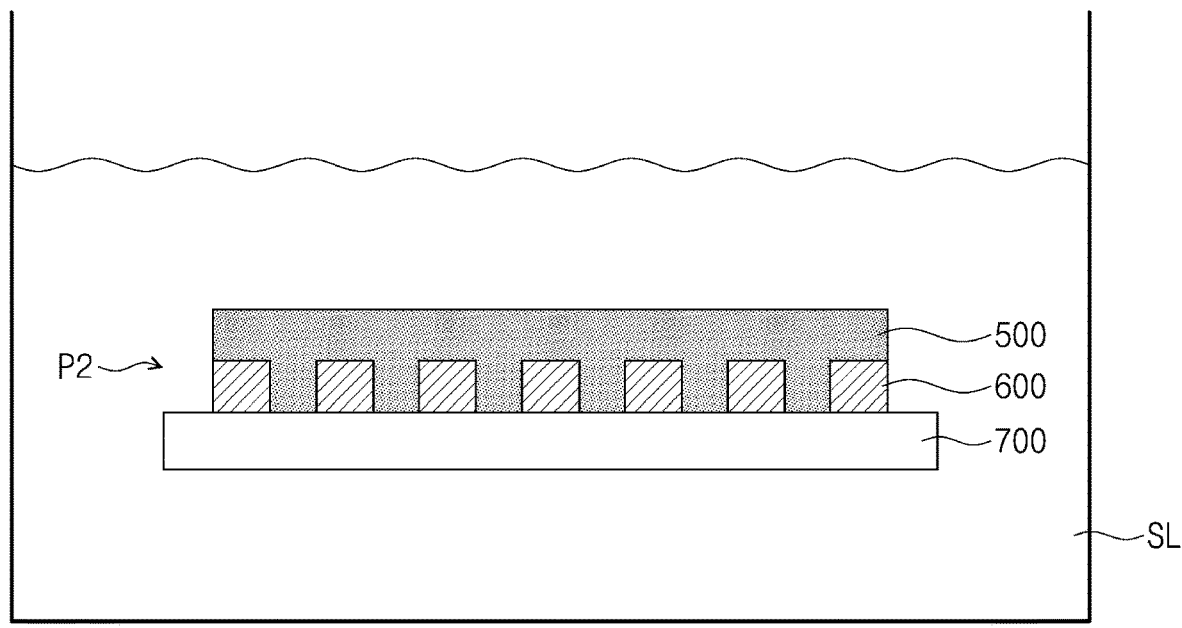

Referring to FIG. 10, after the forming of the porous structure 500p, a first solution SL may be prepared. The first solution SL may be a solution in which an organic electrochromic material is dispersed in a certain solvent. After the first solution SL is prepared in a container, the porous structure 500p, the second transparent electrodes 600, and the second substrate 700 prepared in FIG. 9 may be put in the first solution SL. Alternatively, a certain amount of the first solution SL may be applied onto an upper surface of the porous structure to make the first solution SL permeate into the porous structure. Accordingly, the organic electrochromic material in the first solution SL may be adsorbed in the porous structure 500p to form a second electrochromic layer 500. Accordingly, a second structure P2 including the second substrate 700, the second transparent electrodes 600, and the second electrochromic layer 500 may be formed.

Figure 11:
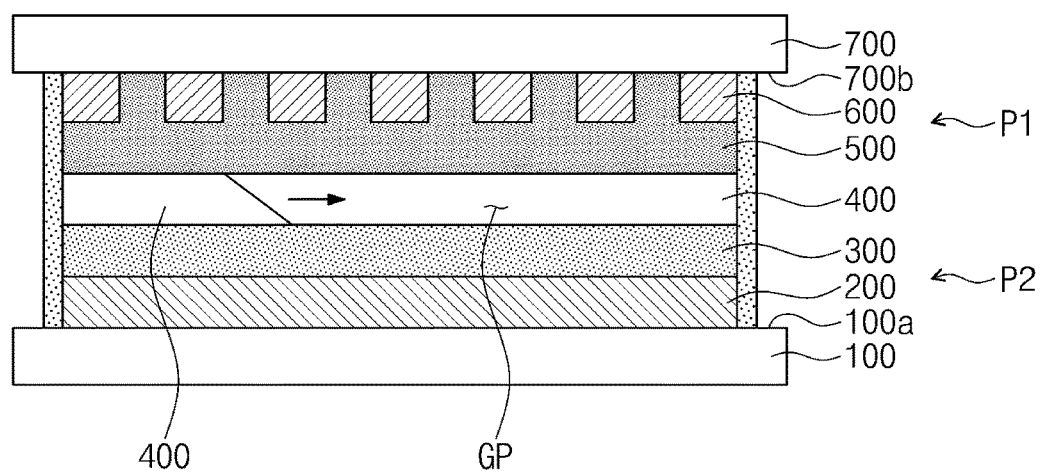

Referring to FIG. 11, the first structure P1 and the second structure P2 may be fixed using the sealing material 800. More specifically, the sealing material 800 may be disposed between the upper surface 100a of the first substrate 100 and the lower surface 700b of the second substrate 700. In this case, a certain gap region GP may be formed between the first structure P1 and the second structure P2 by adjusting the height of the sealing material 800. The gap region GP may be disposed between the first electrochromic layer 300 and the second electrochromic layer 500.

For example, when an electrolyte layer 400 is a liquid, an electrolyte material may be injected into the gap region GP to form an electrolyte layer 400. As another example, although not shown, when the electrolyte layer 400 is a gel or a solid, the electrolyte layer 400 may be formed on the upper surface of the first electrochromic layer 300 before the fixing of the first structure P1 and the second structure P2 using the sealing material 800.

Experimental Example 1: Synthesis of 3-(4-(bis(4-methoxyphenyl)amino)phenoxy)propylphosphonic Acid (Organic Electrochromic Material)

1) Synthesis of 4-(bis(4-methoxyphenyl)amino)phenol 4-aminophenol (42 g, 0.38 mol), 1,4 dioxane (840 ml), $Pd_2(dba)_3$ (7.04 g, 0.007 mol), $(t-Bu)_3P$ (7.78 g, 0.038 mol), and $K_2CO_3$ (132.98 g, 0.96 mol) were added to 1-bromo-4-methoxybenzene (179.95 g, 0.96 mol), and the mixture was stirred at 90° C. for 12 hours. After 4-aminophenol was consumed, the temperature was adjusted to room temperature, 800 mL of ethyl acetate and 800 mL of water were added thereto and stirred for 30 minutes. An aqueous layer was separated and extracted using ethyl acetate. Thereafter, an organic layer was combined thereto, and the mixture was washed with water and brine, and dried over anhydrous $Na_2SO_4$. After filtration and concentration at certain pressure, the resultant product was purified using column chromatography (EA:hexane=1:8) to obtain a red oil product containing 4-(bis(4-methoxyphenyl)amino)phenol (80.39 g, yield: 65%). The synthesis reaction formula of 4-(bis(4-methoxyphenyl)amino)phenol is shown in Reaction Formula 1 below.

[Reaction Formula 1]

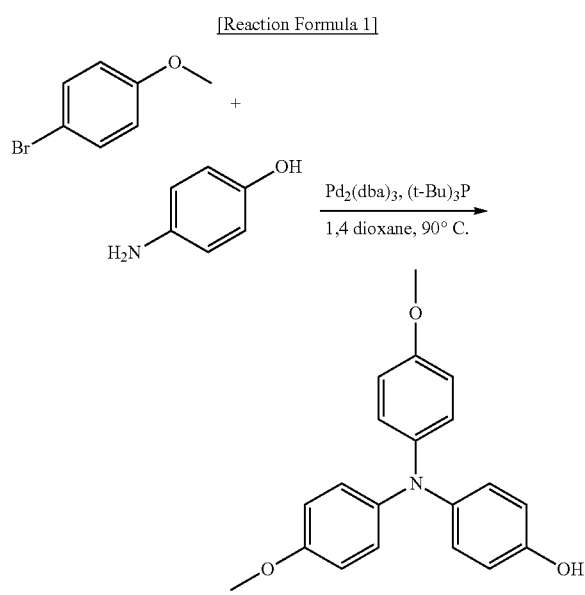

2) Synthesis of N-(4-(3-bromopropoxy)phenyl)-4-methoxy-N-(4-methoxy phenyl)benzenamine T-BuOK (28.07 g, 0.25 mol) and 1,3-dibromopropane (50.5 g, 0.25 mol) were added to a solution in which 4-(bis(4-methoxyphenyl)amino)phenol (80.39 g, 0.25 mol) was dissolved in 800 ml of tetrahydrofuran (THF), and the mixture was stirred for 12 hours at room temperature. After 4-(bis(4-methoxyphenyl)amino)phenol was consumed, the temperature was adjusted to room temperature, 80 mL of ethyl acetate and 80 mL of water were added thereto and stirred for 30 minutes. An aqueous layer was separated and extracted using ethyl acetate. Thereafter, an organic layer was combined thereto, and the mixture was washed with water and brine, and dried over anhydrous $Na_2SO_4$. After filtration and concentration at certain pressure, the resultant product was purified using column chromatography (EA:hexane=1:8) to obtain a red oil product containing N-(4-(3-bromopropoxy)phenyl)-4-methoxy-N-(4-methoxy phenyl)benzenamine (49.78 g, yield: 45%). The synthesis reaction formula of N-(4-(3-bromopropoxy)phenyl)-4-methoxy-N-(4-methoxy phenyl)benzenamine is shown in Reaction Formula 2 below.

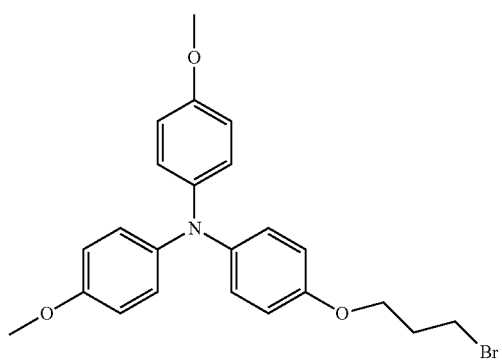

3) Synthesis of Diethyl 3-(4-(bis(4-methoxyphenyl)amino)phenoxy)propylphosphonate A mixture of N-(4-(3-bromopropoxy)phenyl)-4-methoxy-N-(4-methoxyphenyl)benzenamine (49.78 g, 0.11 mol) and triethyl phosphite (110 ml, 0.88 mol) was stirred at 125° C. for 6 hours. The temperature was adjusted to room temperature, and 80 mL of ethyl acetate and 80 mL of water were added thereto and stirred for 30 minutes. An aqueous layer was separated and extracted using ethyl acetate. Thereafter, an organic layer was combined thereto, and the mixture was washed with water and brine, and dried over anhydrous $Na_2SO_4$. After filtration and concentration at certain pressure, the resultant product was purified using column chromatography (EA:hexane=1:8) to obtain a yellow oil product containing diethyl 3-(4-(bis(4-methoxyphenyl)amino)phenoxy)propylphosphonate (49.78 g, yield: 45%). The synthesis reaction formula of diethyl 3-(4-(bis(4-methoxyphenyl)amino)phenoxy)propylphosphonate is shown in Reaction Formula 3 below.

[Reaction Formula 2]

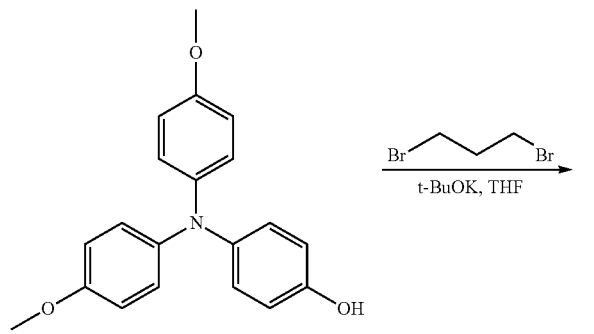

[Reaction Formula 3]

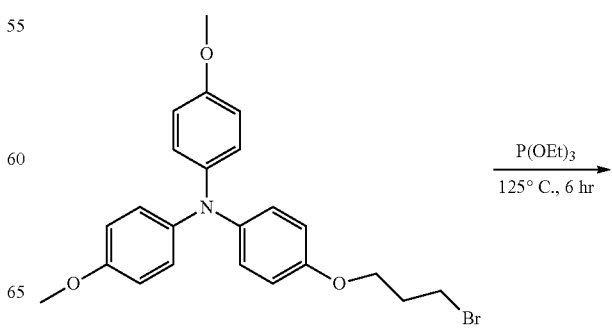

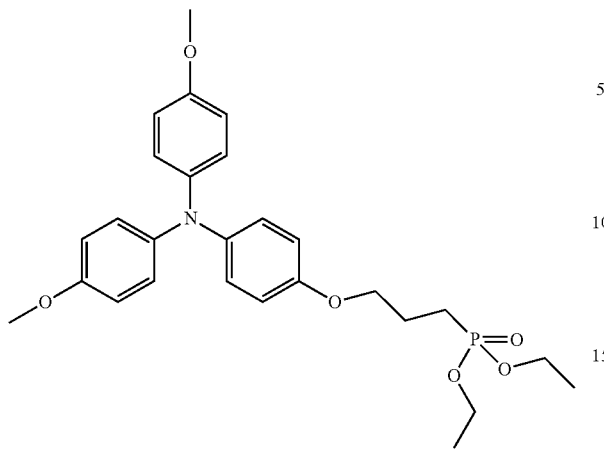

4) Synthesis of 3-(4-(bis(4-methoxyphenyl)amino)phenoxy)propylphosphonic Acid (BMAP)

TMSBr (70.29 g, 0.46 mol) was added to a solution in which diethyl 3-(4-(bis(4-methoxyphenyl)amino)phenoxy)propylphosphonate (25.8 g, 0.057 mol) was dissolved in 516 ml of $CH_2Cl_2$ and the mixture was stirred at 0° C. for 30 minutes. Thereafter, volatile materials were condensed at certain pressure for 15 hours and further stirred. 258 mL of methanol and 258 mL of water were added thereto, and the methanol was condensed at certain pressure and stirred for 1 hour. An aqueous layer was separated and extracted using $CH_2Cl_2$. Thereafter, an organic layer was combined thereto, and the mixture was washed with water and brine, and dried over anhydrous $Na_2SO_4$. After filtration and concentration at certain pressure, the resultant product was purified using column chromatography to obtain a blue solid containing 3-(4-(bis(4-methoxyphenyl)amino)phenoxy)propylphosphonic acid (11.2 g, yield: 44%). The synthesis reaction formula of 3-(4-(bis(4-methoxyphenyl)amino)phenoxy)propylphosphonic acid is shown in Reaction Formula 4 below.

[Reaction Formula 4]

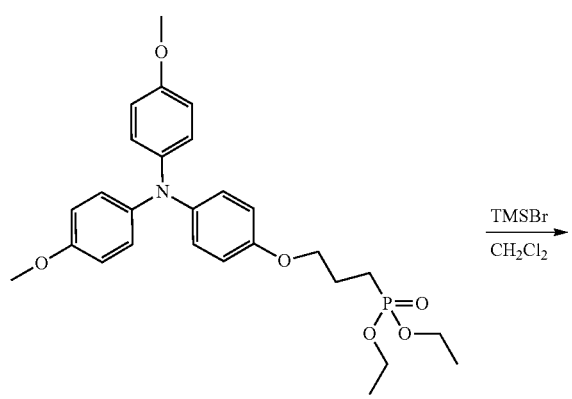

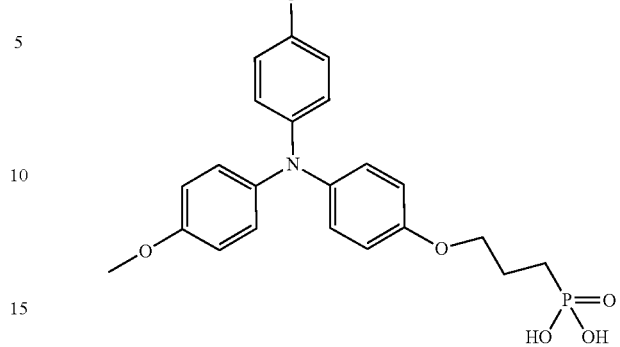

Experimental Example 2: Manufacturing of Electrochromic Display Devices

A fluorine-doped $SnO_2$ substrate (TEC-15, Pilkington Co.) having a sheet resistance of 15 Ω/cm² was used as a first substrate and a second substrate. Surfaces of the first substrate and the second substrate were washed with methanol, acetone, and water. Conductive material was applied onto each of the first substrate and the second substrate, and then a first transparent electrode and second transparent electrodes were formed using a laser device (Wooyang GMS Korea). In this case, the length of the long axis of each of the second transparent electrodes was 94 mm, and the width of each of the second transparent electrodes was 8 mm. The distance between the second transparent electrodes was 0.06 mm.

For a first electrochromic layer, a tungsten oxide layer ($WO_3$) was deposited on the first substrate to a thickness of 250 nm using DC sputtering equipment (SPARKLE-2CM multi-sputter system, Unitex). In this case, process conditions were set to be a power of 100 W, a base pressure of $6.2 \times 10^{-6}$ torr, a working pressure of 20 mtorr, an Ar pressure of 20 sccm, an $O_2$ pressure of 3.1 sccm, and a deposition time of 30 minutes.

For a second electrochromic material, 3-(4-(bis(4-methoxyphenyl)amino)phenoxy)propylphosphonic acid (hereinafter, BMAP) synthesized in Experimental Example 2 was prepared. A high-temperature $TiO_2$ paste (ENB Korea) was applied onto the second substrate on which the second transparent electrodes were formed, using a doctor blade method. The high-temperature $TiO_2$ paste may include $TiO_2$ nanoparticles of 20 nm or less, terpineol, lauric acid, and ethyl cellulose. The $TiO_2$ thin film was dried at room temperature for 20 minutes and then dried at 95° C. for 30 minutes. Thereafter, a heat treatment process (raised up to 450° C. from room temperature at 5° C./min) was performed to form a preliminary second electrochromic layer. In this case, the thickness of the preliminary porous structure was 5 μm.

Thereafter, a 0.5 mM BMAP ethanol solution was prepared and the substrate on which the preliminary second electrochromic layer was formed was subjected to dipping into the solution for 20 hours. After the dipping, the substrate was washed with ethanol and dried with nitrogen gas.

A Surlyn film having a thickness of 60 μm was provided between the first substrate and the second substrate, and heat-treated at 115° C. for about 1 minute to bond the first substrate with the second substrate. Accordingly, the first substrate and the second substrate were fixed to each other. After removing air from a gap region between the first electrochromic layer and the second electrochromic layer, an electrolyte solution was injected to form an electrolyte layer. The electrolyte solution was prepared by dispersing $LiClO_4$ at 0.2 M in propylene carbonate. Accordingly, an electrochromic display device according to an embodiment was manufactured.

Experimental Example 3: Measurement of Transmittance Spectrum

Figure 12A:
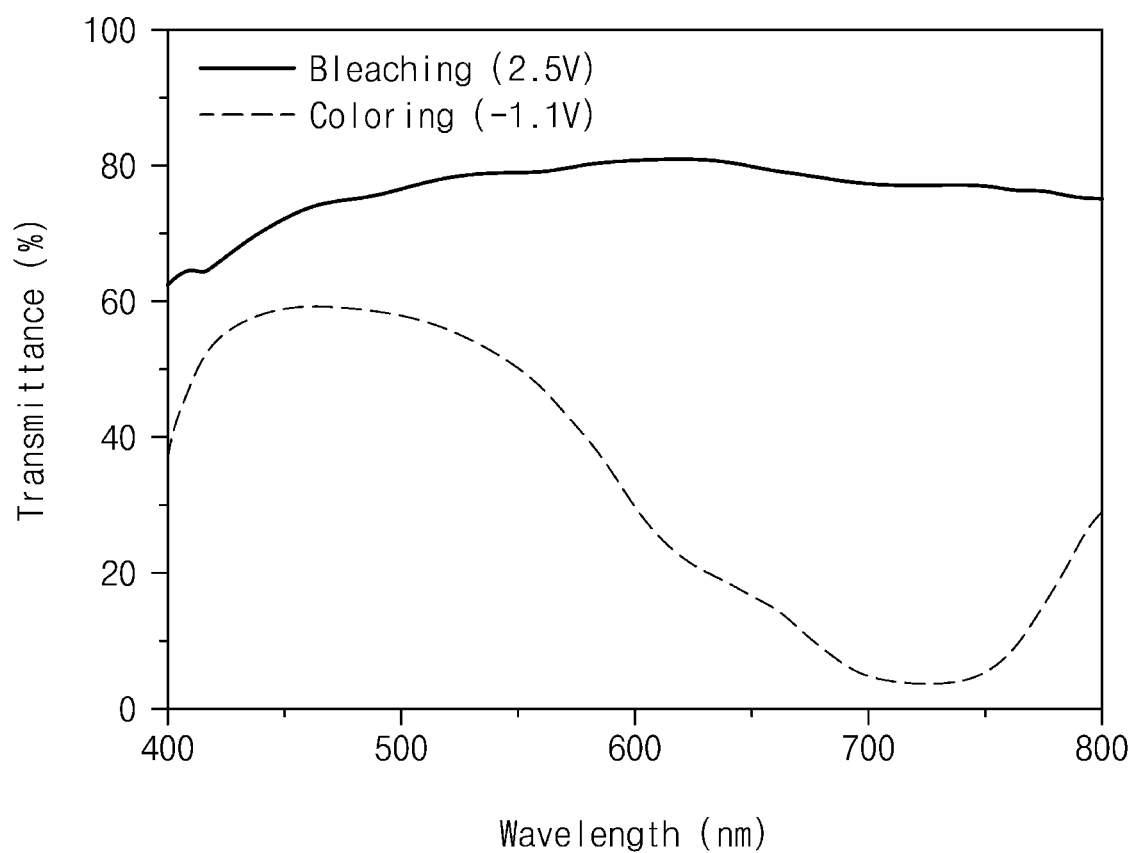
FIGS. 12A and 12B are graphs for describing the operation of coloring and bleaching of an electrochromic display device according to an embodiment of the inventive concept.

FIGS. 12A and 12G show driving images of coloring and bleaching of an electrochromic display device to which a bleaching voltage of 2.5 V and a coloring voltage of −1.1 were respectively applied for 5 seconds.

Figure 12B:
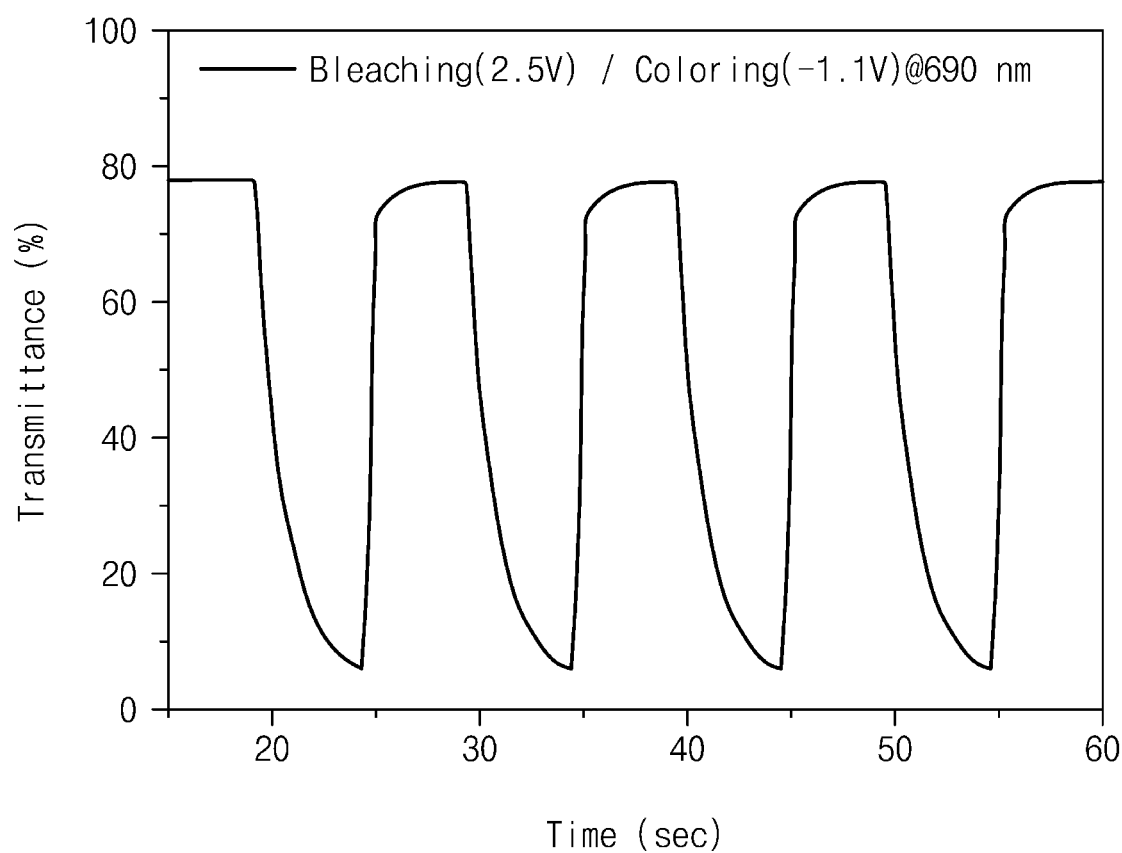

FIGS. 12A and 12B are graphs for describing the operation of coloring and bleaching of an electrochromic display device according to an embodiment of the inventive concept. More specifically, FIG. 12A is a graph showing transmittance according to wavelength, and FIG. 12B is a graph showing changes in transmittance according to time for light having a wavelength of 690 nm.

Referring to FIG. 12A, it is seen that the electrochromic display device displays blue light upon coloring and displays a transparent state upon bleaching. Referring to FIG. 12b, the transmittance of bleaching was measured to be 77.8% and the transmittance of coloring was measured to be 5.5% at a wavelength of 690 nm, and at a transmittance change of 90%, the response speed of bleaching was 0.7 seconds and the response speed of coloring was 2.9 seconds.

Figure 13:
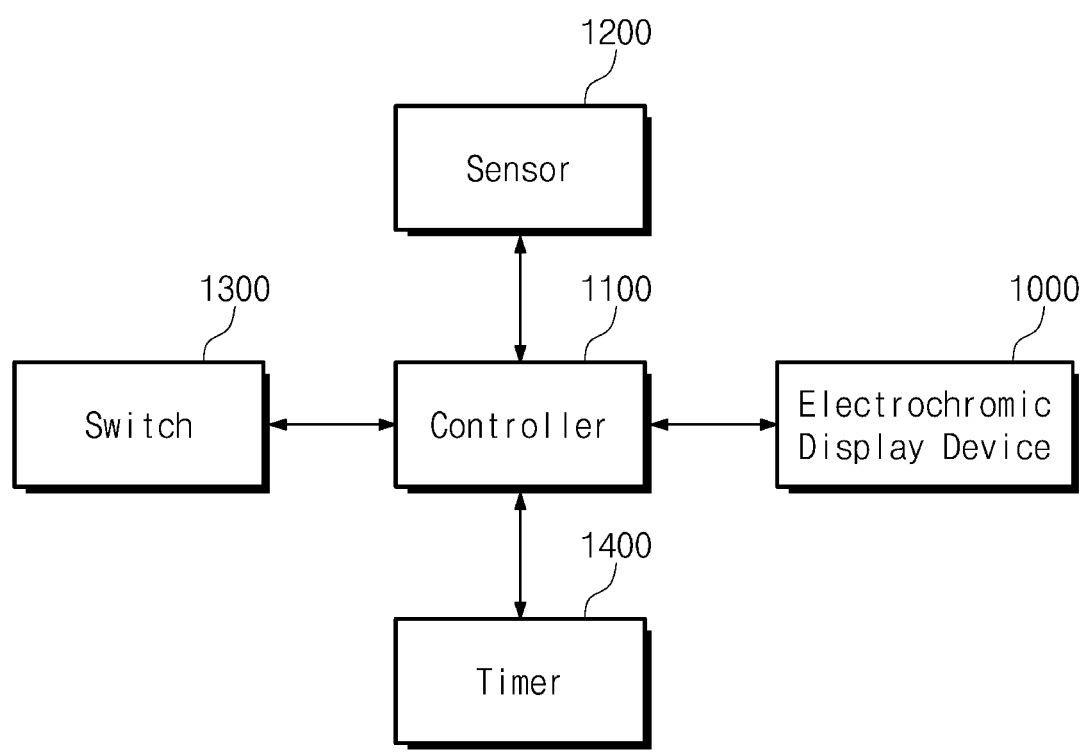
FIG. 13 is a configuration module of an electrochromic display system according to an embodiment of the inventive concept.

FIG. 13 is a configuration module of a film-based electrochromic display system according to an embodiment of the inventive concept. Referring to FIG. 13, the electrochromic display system according to an embodiment of the inventive concept may include an electrochromic display device 1000, a controller 1100, a sensor 1200, a switch 1300, and a timer 1400.

The controller 1100 may control the operation of the electrochromic display device 1000, and may generally manage the functions of the sensor 1200, the switch 1300, and the timer 1400. The sensor 1200 may detect external signals or motions. The switch 1300 may be supplied with a power voltage required for operation, and when the switch 1300 is turned on, the power required in the electrochromic display device 1000 is supplied, and when the switch 1300 is turned off, the power supplied into the electrochromic display device 1000 is cut off. The timer 1400 may serve to set a time.

An electrochromic display device according to embodiments of the inventive concept may include first transparent electrodes or second transparent electrodes, which are patterned. The first transparent electrodes and the second transparent electrodes may form various types of unit pixels. Accordingly, an electrochromic display device capable of displaying various patterns may be provided.

Effects of the present disclosure are not limited to the effects described above, and those skilled in the art may understand other effects from the following description.

Although the embodiments of the inventive concept have been described above with reference to the accompanying drawings, those skilled in the art to which the inventive concept pertains may implement the inventive concept in other specific forms without changing the technical idea or essential features thereof. Therefore, it should be understood that the embodiments described above are examples in all respects and not restrictive.

What is claimed is:

1. An electrochromic display device comprising:
a first substrate;
a second substrate provided on the first substrate;
an electrolyte layer disposed between the first substrate and the second substrate;
a first transparent electrode provided between the electrolyte layer and the first substrate;
a plurality of second transparent electrodes provided between the electrolyte layer and the second substrate;
a first electrochromic layer provided between the first transparent electrode and the electrolyte layer; and
a second electrochromic layer provided between the second transparent electrodes and the electrolyte layer,
wherein the second transparent electrodes each extend in a first direction and are disposed apart from each other in a second direction perpendicular to the first direction,
the second electrochromic layer extends between the second transparent electrodes and contacts a lower surface of the second substrate,
the first electrochromic layer includes an inorganic electrochromic material, and
the second electrochromic layer includes an organic electrochromic material,
the organic electrochromic material containing a material represented by Formula 1 or Formula 2 below:

[Formula 1]

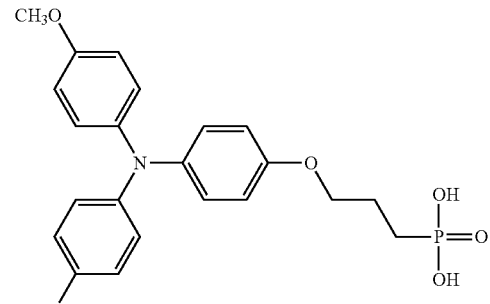

[Formula 2]

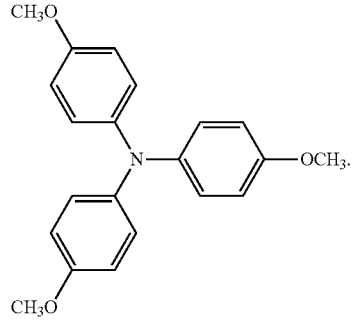

2. The electrochromic display device of claim 1, wherein the inorganic electrochromic material comprises tungsten oxide ($WO_3$).

3. The electrochromic display device of claim 1, wherein the second transparent electrodes each have a width of about 10 nm to about 100 mm in the second direction.

4. The electrochromic display device of claim 1, wherein the second transparent electrodes each have a separation distance of about 10 nm to about 1,000 mm in the second direction.

5. The electrochromic display device of claim 1, wherein the first transparent electrode is provided in plurality,
the first transparent electrodes extending in the second direction and disposed apart from each other in the first direction.

6. The electrochromic display device of claim 5, wherein the first transparent electrodes and the second transparent electrodes are arranged in the form of a grid when viewed in a plane.

7. The electrochromic display device of claim 5, wherein the first electrochromic layer extends between the first transparent electrodes and contacts an upper surface of the first substrate.

8. The electrochromic display device of claim 5, wherein any one of the first transparent electrodes and any one of the second transparent electrodes form a unit pixel,
the unit pixel displaying a transparent color or a blue color.

9. The electrochromic display device of claim 1, further comprising a sealing material provided between the first substrate and the second substrate,
wherein the sealing material covers side surfaces of the first electrochromic layer and the second electrochromic layer.

10. The electrochromic display device of claim 1, wherein the second electrochromic layer further comprises a porous structure including metal oxide, and
the organic electrochromic material is adsorbed in the porous structure.

11. The electrochromic display device of claim 10, wherein the metal oxide comprises titanium oxide ($TiO_2$) or indium tin oxide (ITO).

* * * * *